United States Patent
Abdollahian et al.

(10) Patent No.: US 9,646,202 B2
(45) Date of Patent: May 9, 2017

(54) IMAGE PROCESSING SYSTEM FOR CLUTTERED SCENES AND METHOD OF OPERATION THEREOF

(71) Applicant: Sony Corporation, Tokyo (JP)

(72) Inventors: Golnaz Abdollahian, San Jose, CA (US); Alexander Berestov, San Jose, CA (US); Hiromasa Naganuma, Ichikawa (JP); Hiroshige Okamoto, Yokohama (JP)

(73) Assignee: Sony Corporation, Tokyo (JP)

( * ) Notice: Subject to any disclaimer, the term of this patent is extended or adjusted under 35 U.S.C. 154(b) by 83 days.

(21) Appl. No.: 14/599,431

(22) Filed: Jan. 16, 2015

(65) Prior Publication Data

US 2016/0210523 A1    Jul. 21, 2016

(51) Int. Cl.
*G06K 9/00* (2006.01)
*G06K 9/32* (2006.01)
*G06K 9/68* (2006.01)

(52) U.S. Cl.
CPC ......... *G06K 9/00442* (2013.01); *G06K 9/325* (2013.01); *G06K 9/68* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 5,268,967 A | 12/1993 | Jang et al. | |
| 5,321,770 A | 6/1994 | Huttenlocher et al. | |
| 5,809,167 A | 9/1998 | Al-Hussein | |
| 5,892,843 A | 4/1999 | Zhou et al. | |
| 6,470,094 B1 | 10/2002 | Lienhart et al. | |
| 7,327,882 B2 | 2/2008 | Wang et al. | |
| 8,208,698 B2 | 6/2012 | Bogdan | |
| 8,224,092 B2 | 7/2012 | Bressan | |
| 8,255,948 B1 * | 8/2012 | Black | H04N 21/23433 709/219 |
| 8,311,329 B2 | 11/2012 | Meyer et al. | |
| 8,335,402 B1 | 12/2012 | Manmatha et al. | |
| 8,509,534 B2 | 8/2013 | Galic et al. | |
| 8,649,600 B2 | 2/2014 | Saund | |
| 8,917,935 B2 | 12/2014 | Epshtein et al. | |

(Continued)

OTHER PUBLICATIONS

Bouman, K.L.—"A low complexity method for detection of text area in natural images"—IEEE 2010, pp. 1050-1053.*

(Continued)

*Primary Examiner* — Bernard Krasnic
(74) *Attorney, Agent, or Firm* — Haverstock & Owens LLP

(57) ABSTRACT

An image processing system and method of operation includes: a source image having source pixels; homogeneous blocks in the source image having a block color; a homogeneous region in the source image formed by merging the homogeneous blocks having the block color within a color threshold; a text background region having text pixels and background pixels in the homogeneous region with the text background region having a texture feature above a texture threshold and a region size above a region size threshold; and a binary text mask representing the text pixels and the background pixels for displaying on a device.

17 Claims, 9 Drawing Sheets

(56) References Cited

U.S. PATENT DOCUMENTS

| | | | | |
|---|---|---|---|---|
| 2004/0255249 | A1* | 12/2004 | Chang | G06F 17/30796 715/723 |
| 2005/0180647 | A1 | 8/2005 | Curry et al. | |
| 2008/0303942 | A1* | 12/2008 | Chang | G06F 17/30796 348/468 |
| 2012/0075440 | A1* | 3/2012 | Ahuja | G06T 7/0081 348/61 |
| 2014/0201180 | A1* | 7/2014 | Fatourechi | G06F 17/30038 707/706 |
| 2015/0169972 | A1 | 6/2015 | Vu et al. | |
| 2015/0228045 | A1* | 8/2015 | Mehta | G06T 1/0064 382/103 |

OTHER PUBLICATIONS

Hanif, S.M.—"Texture based text detection in natural scene images: A help to blind and visually impaired persons"—CVHI 2007, pp. 1-6.*

Kumar, S.—"Text extraction and document image segmentation using matched wavelets and MRF Model"—IEEE 2007, pp. 2117-2128.*

U.S. Appl. No. 14/599,417, filed Jan. 16, 2015, Abdollahian.

U.S. Appl. No. 14/599,423, filed Jan. 16, 2015, Abdollahian et al.

Dawood et al., Improved Arabic Word Classification using Spatial Pyramid Matching Method, , p. 6 pgs, Image Processing and Pattern Recognition Laboratory, Beijing Normal University, Beijing, China; Retrieved on Dec. 4, 2013.

Epshtein et al., Detecting Text in Natural Scenes with Stroke Width Transform, , pp. 1-8, Microsoft Corporation; Retrieved on Dec. 4, 2013.

Gatos et al., Restoration of Arbitrarily Warped Document Images Based on Text Line and Word Detection, Pattern Recognition, and Applications, Feb. 14, 2007, pp. 203-208, Proceedings of the Fourth IASTED International Conference Signal Processing, Innsbruck, Austria.

Gllavata et al., A Robust Algorithm for Text Detection in Images, , p. 6pgs, University of Siegen, Siegen, Germany, Dept. of Math. & Computer Science; Retrieved on Dec. 5, 2013.

Neumann, Scene text recognition in images and video, PhD Thesis Proposal, Aug. 31, 2012, p. 56 pgs, Department of Cybernetics, Center for Machine Perception, Czech Technical University in Prague, Czech.

Rothacker, Learning Bag-of-Features Representations for Handwriting Recognition, Diploma thesis, Nov. 2011, p. 90 pgs, Department of computer science Technische Universitt Dortmund, Germany.

Song et al., A Novel Image Text Extraction Method Based on K-means Clustering, Seventh IEEE/ACIS International Conference on Computer and Information Science, 2008, pp. 185-190, IEEE, Beijing, China.

Yang et al., Evaluating Bag-of-Visual-Words Representations in Scene Classification, WOODSTOCK '97 El Paso, Texas, , p. 9 pgs, US.

Saragiotis et al., "Local Skew Correction in Documents", "International Journal of Pattern Recognition and Artificial Intelligence", 2008, 20 Pages (691-710), vol. 22, No. 4, World Scientific Publishing Company.

* cited by examiner

IMAGE PROCESSING SYSTEM FOR CLUTTERED SCENES AND METHOD OF OPERATION THEREOF

CROSS-REFERENCE TO RELATED APPLICATION(S)

The present application contains subject matter related to a concurrently filed U.S. Patent Application by Golnaz Abdollahian entitled "IMAGE PROCESSING SYSTEM WITH LAYOUT ANALYSIS AND METHOD OF OPERATION THEREOF". The related application is assigned to Sony Corporation and is identified as U.S. patent application Ser. No. 14/599,417, filed Jan. 16,2015( now U.S.Pat. No. 9,430,704). The subject matter thereof is incorporated herein by reference thereto.

The present application contains subject matter related to a concurrently filed U.S. Patent Application by Golnaz Abdollahian, Alexander Berestov, Hiromasa Naganuma, and Hiroshige Okamoto entitled "TEXT RECOGNITION SYSTEM WITH FEATURE RECOGNITION AND METHOD OF OPERATION THEREOF". The related application is assigned to Sony Corporation and is identified as U.S. patent application Ser. No. 14/599,423, filed Jan. 16,2015 (now U.S. Pat. No. 9,582,727). The subject matter thereof is incorporated herein by reference thereto.

TECHNICAL FIELD

The present invention relates generally to image processing systems, and more particularly to an image processing system for cluttered scenes.

BACKGROUND ART

The deployment of high quality imaging to smart phones, digital cameras, personal digital assistants (PDA), and other information devices with screens has grown tremendously in recent years. The wide variety of information devices supporting image processing and text recognition requires the ability to process multiple types of images with varying degrees of available text information.

Imaging devices with optical character recognition (OCR) can employ a variety of techniques for recognizing text. Some OCR systems can extract textual information from structured documents where the location of text in the image can be predicted. Other OCR systems can extract text from images having simple, uncluttered backgrounds where the text can be readily identified. Such systems are processing information in images of varying quality, resolution, and orientation, but rely on additional text cues such as regular spacing, orientation, and fonts to assist in text detection.

Thus, a need still remains for an image processing system that can deliver good picture quality and features across a wide range of device with different sizes, resolutions, and image quality. In view of the increasing demand for providing optical character recognition on the growing spectrum of intelligent imaging devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to save costs, improve efficiencies and performance, and meet competitive pressures, adds an even greater urgency to the critical necessity for finding answers to these problems.

Solutions to these problems have long been sought but prior developments have not taught or suggested any solutions and, thus, solutions to these problems have long eluded those skilled in the art.

DISCLOSURE OF THE INVENTION

The present invention provides a method of operation of an image processing system including: receiving a source image having source pixels; forming a homogeneous region in the source image by merging homogeneous blocks each having a block color within a color threshold; identifying a text background region in the homogeneous region, the text background region having a texture feature above a texture threshold and a region size above a region size threshold; identifying text pixels and background pixels by k-means clustering the source pixels in the text background region; and forming a binary text mask representing the text pixels and the background pixels for displaying on a device.

The present invention provides an image processing system including: a source image having source pixels; homogeneous blocks in the source image having a block color; a homogeneous region in the source image formed by merging the homogeneous blocks having the block color within a color threshold; a text background region having text pixels and background pixels in the homogeneous region with the text background region having a texture feature above a texture threshold and a region size above a region size threshold; and a binary text mask representing the text pixels and the background pixels for displaying on a device.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
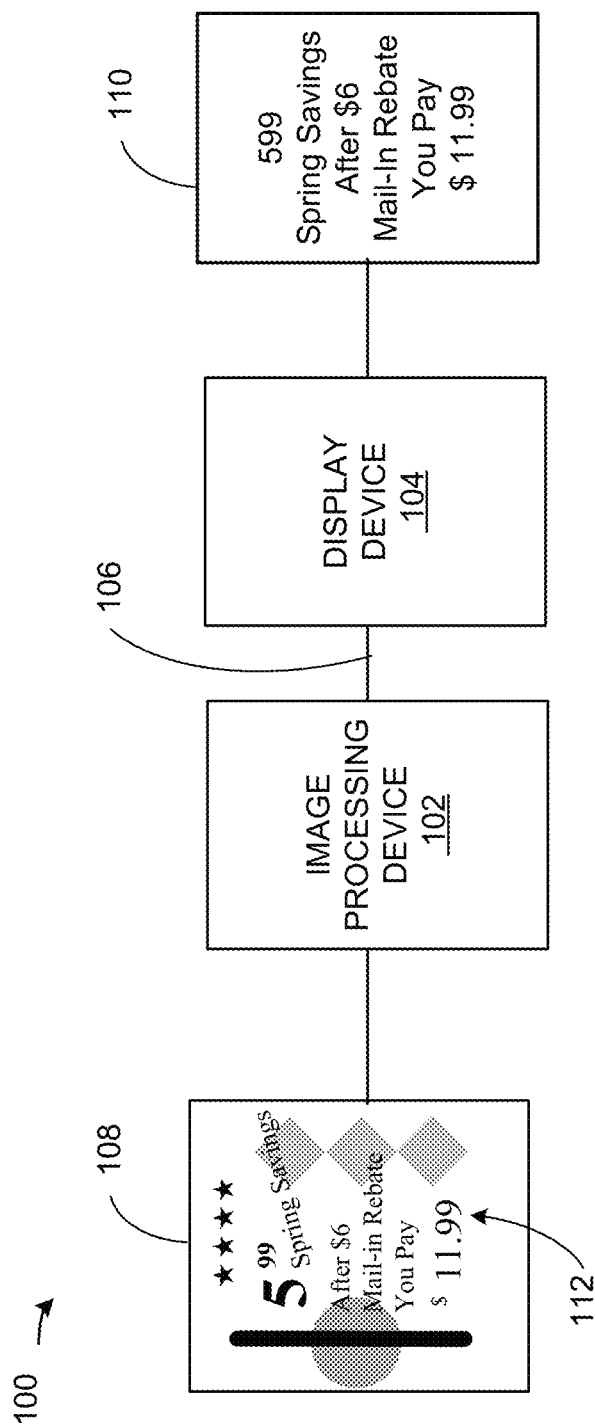
FIG. 1 is a block diagram of an image processing system in an embodiment of the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown greatly exaggerated in the drawing FIGS. Where multiple embodiments are disclosed and described, having some features in common, for clarity and ease of illustration, description, and comprehension thereof, similar and like features one to another will ordinarily be described with like reference numerals.

The term "module" referred to herein can include software, hardware, or a combination thereof in the present invention in accordance with the context used. The term "similar color" means that two element have a color within a color threshold of one another.

The term "directly adjacent" means that two or more elements are next to one another with no other similar element between them. The term "adjacent" means two or more elements are next to one another. The term "connected" means that two or more pixels are next to one another.

Referring now to FIG. 1, therein is shown a block diagram of an image processing system 100 in an embodiment of the present invention. The image processing system 100 can receive a source image 108 in an image processing device 102 and generate a processed text image 110 for display on a display device 104. The image processing device 102 can be coupled to the display device 104 with a communication path 106.

The source image 108 is a picture including elements representing text in a cluttered and unstructured picture. The source image 108 includes a mixture of text and graphics. For example, the source image 108 can be a representation of a print advertisement with text and graphical elements.

The cluttered picture can include text completely or partially overlaid on top of graphical elements. The cluttered picture can include complex graphical elements located on or near textual elements. The graphical elements can include other image, color segments, graphical characters, design, text effects, shaded elements, or a combination thereof.

The source image 108 can be unstructured and include textual elements in irregular locations. The textual elements can include variations in size, font, style, stroke size, text color, text background color, or a combination thereof. The boundary of characters can be distorted due to printing artifacts, blurriness, noise, lighting variations, skew, errors, or a combination thereof.

The source image 108 can include textual elements with a small number of individual text characters 112. The source image 108 can include textual elements having two or more characters. The processed text image 110 is a visual representation of the source image 108.

Figure 2:
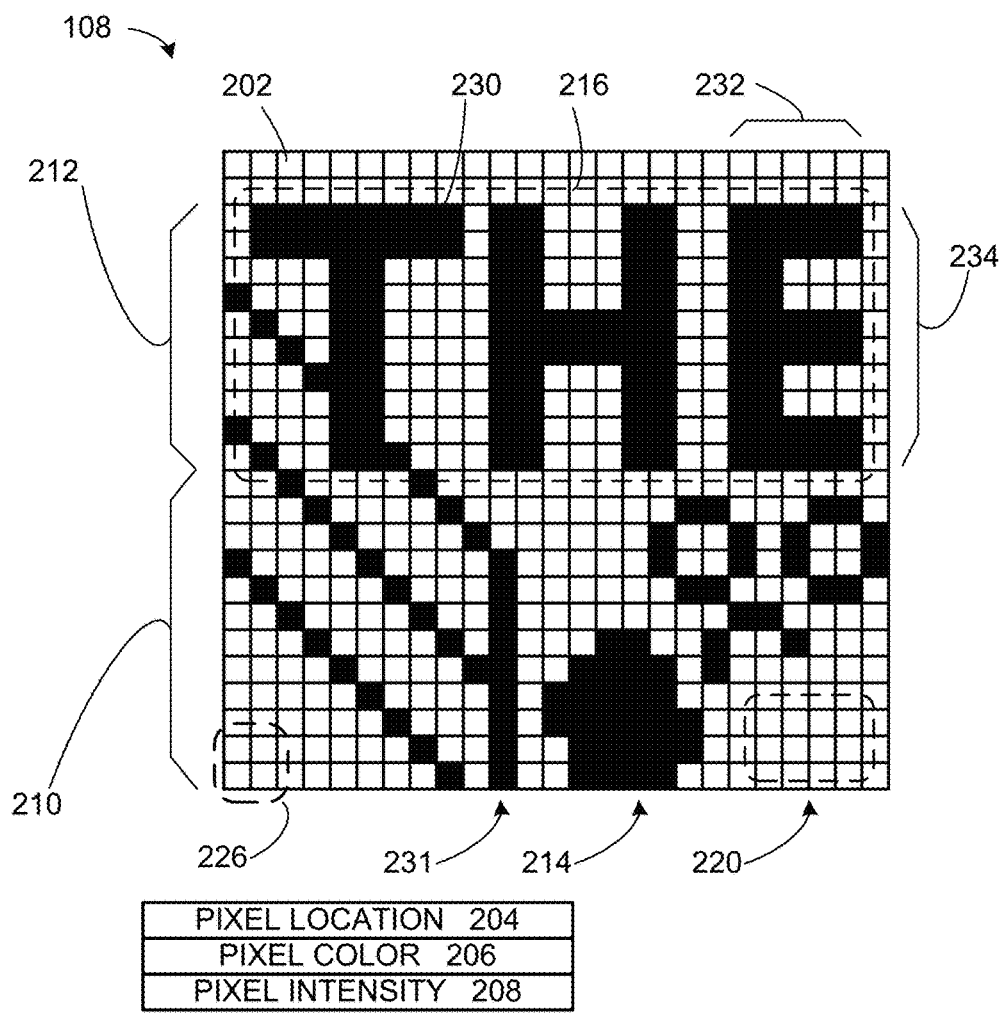
FIG. 2 is an example of the source image.

Referring now to FIG. 2 therein is shown an example of the source image 108. The source image 108 is a picture having source pixels 202. The source pixels 202 are individual graphical elements. The source pixels 202 can have graphical characteristics including a pixel location 204, a pixel color 206, and a pixel intensity 208.

The source image 108 can be partitioned into text regions 212, graphical background regions 214, and text background regions 216. The text regions 212 are groups of the source pixels 202 that represent the text characters 112 of FIG. 1. The text regions 212 can include text pixels 230.

The graphical background regions 214 are groups of the source pixels 202 that do not represent text characters. For example, the non-text regions 210 may represent areas of color, graphical elements, photographic images, lines, geometric shapes, or a combination thereof. The graphical background regions 214 and the text background regions 216 can include the background pixels 231.

The text background regions 216 are graphical areas of the source image 108 that can be encompass one or more of the text regions 212. The text background regions 216 can include the text pixels 230 and the background pixels 231.

The text background regions 216 can be defined by a convex hull. The convex hull is a set point defining a polygon that encompasses a group of the text regions 212.

The source image 108 can include homogeneous regions 220. The homogeneous regions 220 are groups of the source pixels 202 that have a uniform color or intensity. For example, one of the homogeneous regions 220 can represent a low contrast areas in a photograph such as a road or a wall.

The homogeneous regions 220 can be designed as text regions 212, graphical background regions 214, or text background regions 216. The homogeneous regions 220 can be formed from homogeneous blocks 226. The homogeneous blocks 226 are regular groups of the source pixels 202 in the source image 108 that have uniform color or intensity. The homogeneous blocks 226 can include a block color 232 and a block intensity 234.

The text background regions 216 can include graphical images of text characters. The text characters can include a character height 232 and a character width 234.

Figure 3:
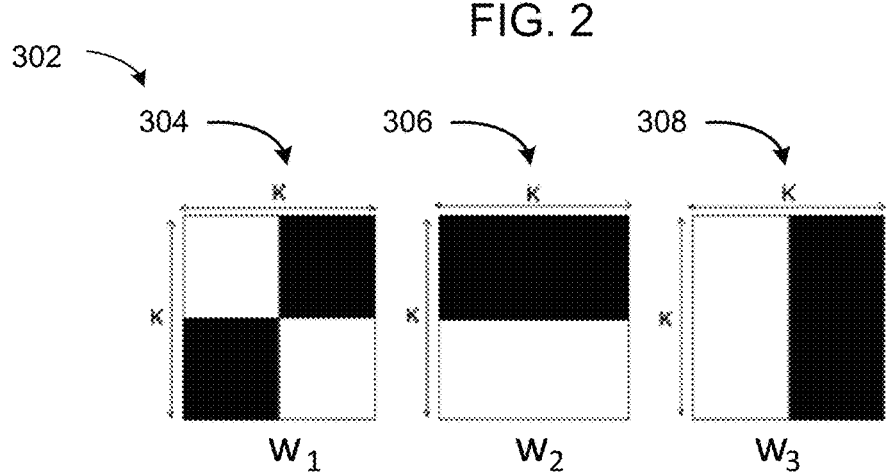
FIG. 3 is an example of block filters.

Referring now to FIG. 3 therein is shown an example of block filters 302. The block filters 302 can be used to detect the level of homogeneity in a block. The block filters 302 can include a diagonal filter 304, a horizontal filter 306, and a vertical filter 308. The diagonal filter 304 can be used to calculate a measure of diagonal homogeneity, horizontal homogeneity, and vertical homogeneity, respectively.

Figure 4:
FIG. 4 is an example of one of the text background regions.

Referring now to FIG. 4 therein is shown an example of one of the text background regions 216. The text background regions 216 can include some of the text regions 212 within one of the text background regions 216.

Figure 5:
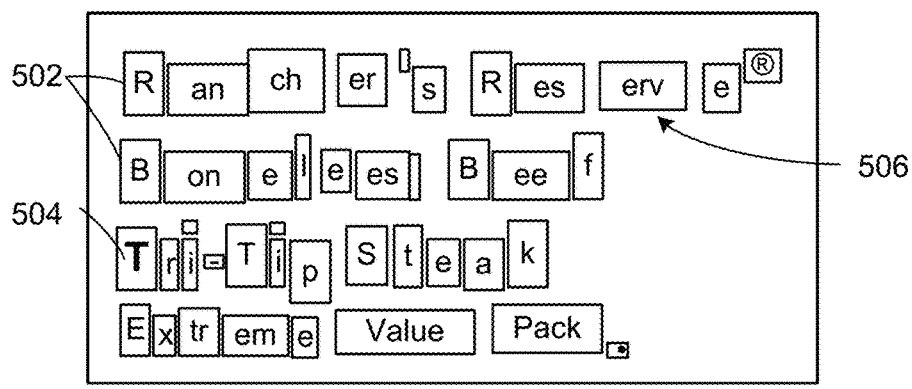
FIG. 5 is an example of clustering.

Referring now to FIG. 5 therein is shown an example of clustering. Clustering is a process to group related pixels together. Clustering can be used to improve text detection results.

Bounding boxes 502 are formed to encompass the maximum x-coordinate, the maximum y-coordinate, the minimum x-coordinate, and the minimum y-coordinate of one of text components 504. The bounding boxes 502 completely surround one of the text components 504.

The text components 504 are groups of the source pixels 202 of FIG. 2 that can represent a text character. For example, one of the text components 504 can represent a letter "A" or "Z". The text components 504 can be graphical candidates for representing a text character.

The bounding boxes 502 can be around connected components 506. The connected components 506 can be a graphical representation of characters that are connected.

Figure 6:
FIG. 6 is an example of the binary text mask after text detection.

Referring now to FIG. 6 therein is shown an example of a binary text mask 602 after text detection. The binary text mask 602 can represent the text pixels 230 of FIG. 2 having a value of 1 and shown as white. The binary text mask 602 can represent the graphical background pixels 231 of FIG. 2 as having a value of 0 and shown as black.

The other non-text pixels can be represented by a value 0 and shown in black. However, it is understood that different mechanisms can be used for the binary text mask 602 and the values and colors may be swapped with one another.

Some of the text components 504 of FIG. 5 can include multiple text characters which are connected due to noise, skew, or other graphical errors in the source image 108 of FIG. 1. The text components 504 of FIG. 5 for "Value" and "Pack" may be represented as a single unit because the text characters are connected to one another.

Figure 7:
FIG. 7 is an example of the binary text masks after clustering.

Referring now to FIG. 7 therein is shown an example of the binary text mask 602 after clustering. The clustering process can reduce the number of artifacts bridging between text characters and help separate instances of connected components. The text components 504 of FIG. 5 for the text characters for the words "Value" and "Pack" can be individually identified and processed.

Figure 8:
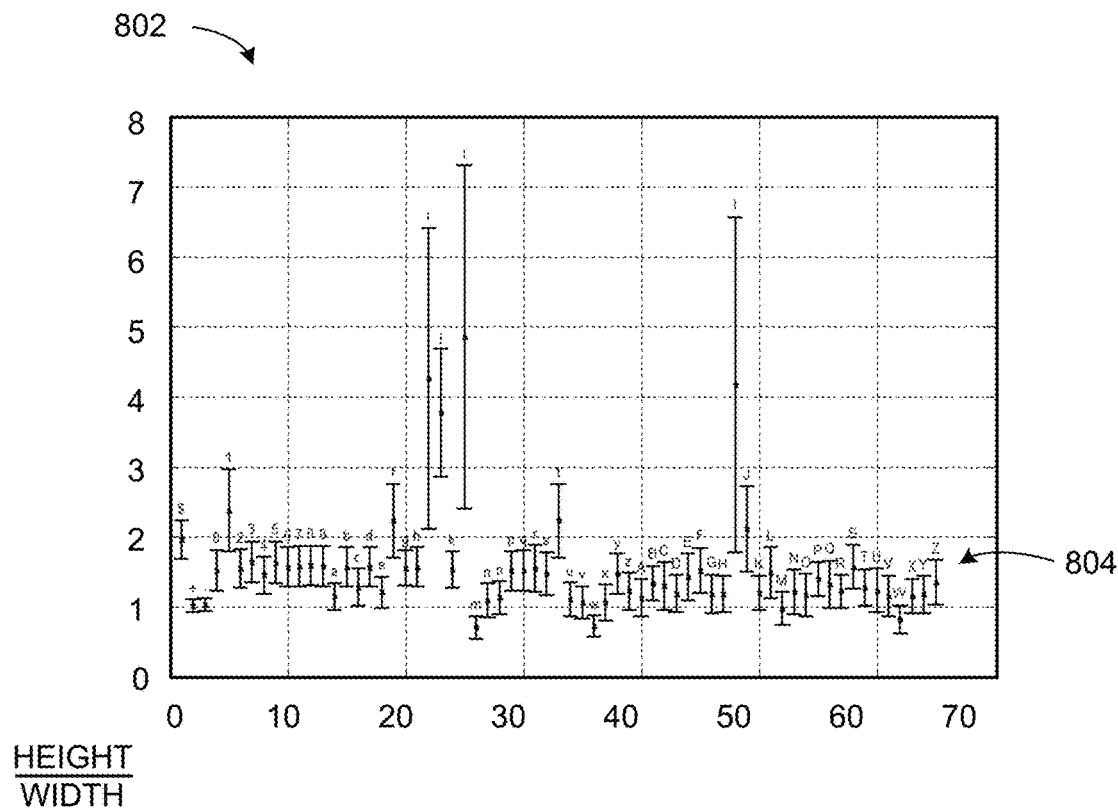
FIG. 8 is an example of an aspect ratio database.

Referring now to FIG. 8, therein is shown an example of an aspect ratio database 802. The aspect ratio database 802 can represent the distribution of values for an aspect ratio 804 for a set of text characters. The aspect ratio 804 can be expressed as a value, ratio, percentage, range, or a combination thereof.

Figure 9:
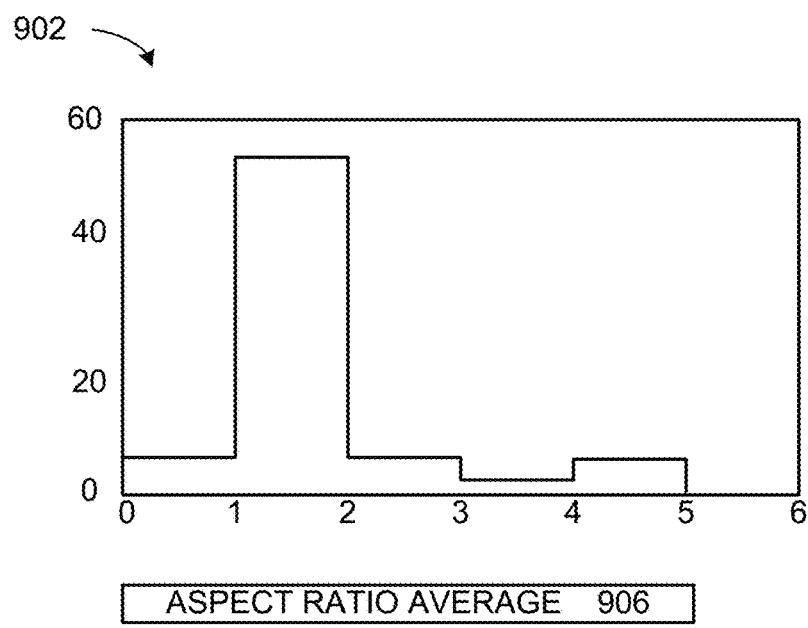
FIG. 9 is an example of the aspect ratio histogram.

Referring now to FIG. 9 therein is shown an example of the aspect ratio histogram 902. The aspect ratio histogram 902 can indicate the distribution of the values for the aspect ratio 804 of FIG. 8 for a set of the text characters 112 of FIG. 1. For example, the aspect ratio histogram 902 can be used to calculate an aspect ratio average 906 that can be used separate individual text characters that are connected together as connected components 506 of FIG. 5. After the K-means clustering process, some potential text characters may be connected by errant pixels, or due to image irregularities in the source image 108 of FIG. 1.

For example, the aspect ratio average 906 can have a value of 1.55. The aspect ratio average 906 can be used as an aspect ratio average 906. If the aspect ratio 804 of one of the text components 504 of FIG. 5 is below the aspect ratio average 906, then the text components 504 can be one of the connected components 506 having multiple text characters connected together by graphical irregularities.

Wide text characters, such as m, w, or W, can have an average aspect ratio of less than 1. In another example, the average aspect ratio of two connected characters has a value of 0.59 with a standard deviation of 0.22 as shown below:

$$\overline{AR}_2 = 0.59 \tag{1}$$

$$\sigma_2^{AR} = 0.22 \tag{2}$$

Figure 10:
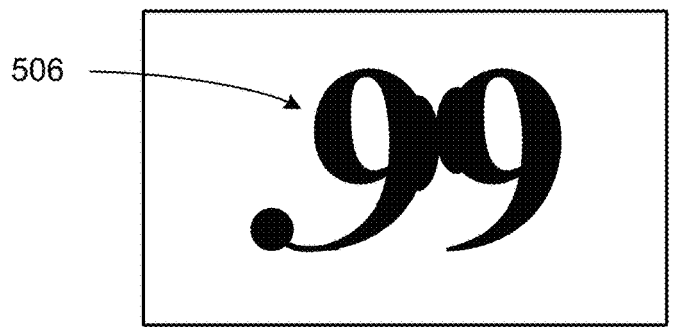
FIG. 10 is an example of the connected components.

Referring now to FIG. 10, therein is shown an example of the connected components 506. The connected components 506 are a set of the source pixels 202 of FIG. 2 representing text characters that are connected. The connected components 506 can represent one of the text components 504 of FIG. 5. The connection can be due to noise, skew, camera angle, printing irregularities, or a combination thereof.

For example, the decimal point is shown as connected with a thin line to the numeral 9. Further, the two numeral "9"s can be connected based on a blurred area between the two numerals.

Figure 11:
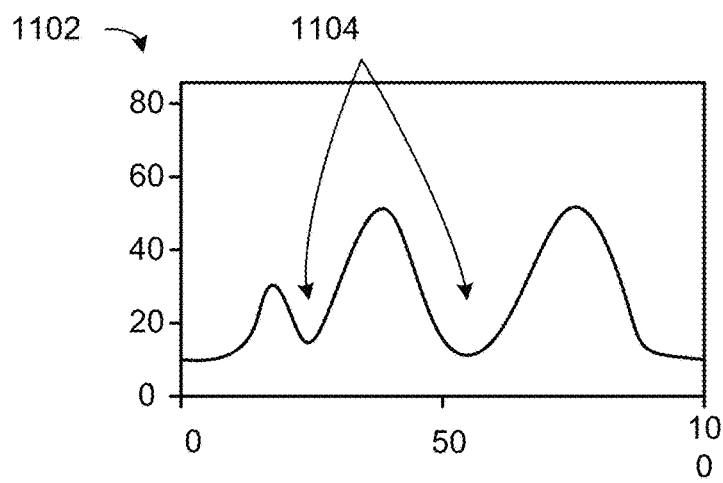
FIG. 11 is an example of an intensity graph.

Referring now to FIG. 11, therein is shown an example of an intensity graph 1102. The intensity graph can show the spatial distribution of the text pixels 230 of FIG. 2 of one of the connected components 506 of FIG. 5 in one of the text background regions 216 of FIG. 2. An intensity local minimums 1104 can indicate where the connected components 506 can be divided to form individual text characters.

Figure 12:
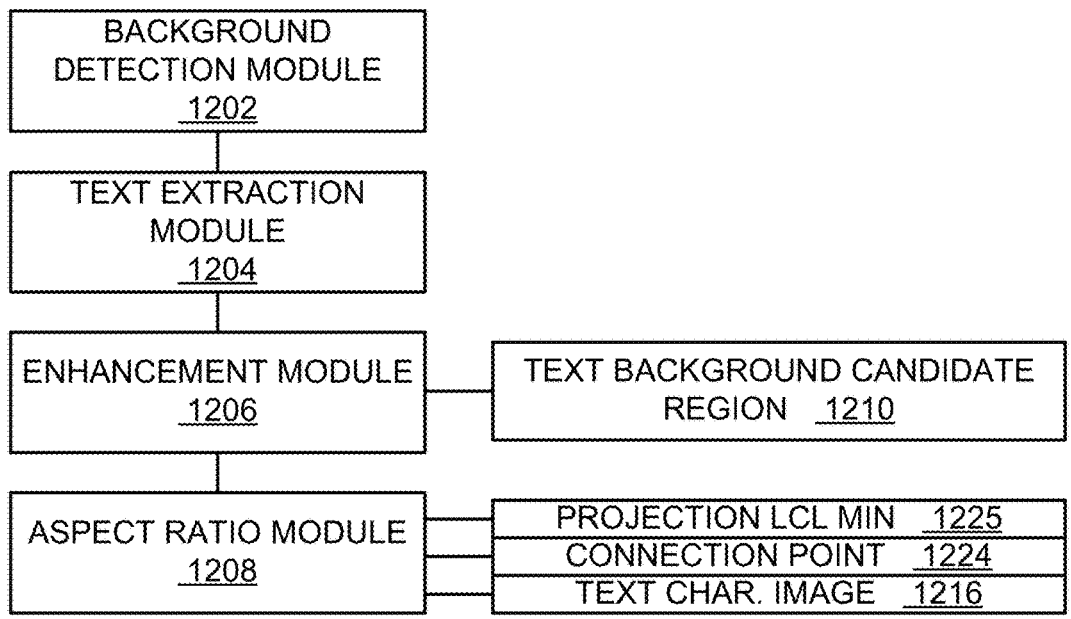
FIG. 12 is a process flow of the image processing system for cluttered scenes.

Referring now to FIG. 12, therein is shown a process flow of the image processing system 100 of FIG. 1 for cluttered scenes. The process flow can include a background detection module 1202, a text extraction module 1204, an enhancement module 1206, and an aspect ratio module 1208.

The background detection module 1202 can process the source image 108 of FIG. 1 to identify the text background regions 216 of FIG. 2. The background detection module 1202 can form and group the homogeneous blocks 226 of FIG. 2 into the homogeneous regions 220 of FIG. 2, grow the homogeneous regions 220 by merging similar adjacent blocks and pixels, discard blocks and regions based on texture and size, and form the final ones of the text background candidate regions. After completion, the background detection module 1202 can pass the control flow to the text extraction module 1204.

The text extraction module 1204 can identify the text background regions 216 surrounding the text regions 212 of FIG. 2. The text extraction module 1204 can perform a color classification of the text background regions 216, identify foreground and background elements, perform a size criteria check, detect the text regions based on the features of the text background regions 216, process large characters, and perform a homogeneous constraint analysis. After completion, the control flow can pass to the enhancement module 1206.

The enhancement module 1206 can apply clustering to a text background candidate region 1210 to compensate for graphical irregularities. The enhancement module 1206 can apply k-means clustering to enhance the text detection results.

One example of clustering can be 2-class K-means clustering. In 2-class K-means clustering, bounding boxes 502 of FIG. 5 can be formed around text components 504 of FIG. 5 in one of the text regions 212. The source pixels 202 of FIG. 2 of text regions 212 inside one of the bounding boxes 502 can be partitioned into two classes, such as a text class and a non-text class.

K-means clustering is a technique for partitioning the source pixels 202 in one of the text regions 212 within the bounding boxes 502 into K different clusters. Each of the bounding boxes 502 can correspond to a box around one of the text components 504.

K-means cluster can partition n points into k clusters where each of the points belongs to the cluster with the nearest mean. The mean of each cluster serves as a base point for the cluster. For example, the n points can represent all of the source pixels 202 related to one of the bounding boxes 502. K-means clustering can partition the source pixels 202 into text and non-text classes, such as the graphical background regions 214 of FIG. 2 and the text background regions 216 having the text regions 212.

Some of the text components 504 can represent more than one text character, where the characters appear to be connected due to noise, skew, or other graphical errors. The bounding boxes 502 can be formed entirely around the text components 504 and encompass two possible text characters. After completion, the control flow can pass to the aspect ratio module 1208.

It has been discovered that applying k-means clustering to the text background regions 216 improves detection of text characters. The k-means clustering reduces the number of graphical irregularities and increasing accuracy of text recognition.

The aspect ratio module 1208 can separate the connected components 506 of FIG. 5 representing multiple text characters. The aspect ratio module 1208 can use aspect ratio analysis to detect and correct cases where multiple components are connected to one another and treated as a single unit. The aspect ratio module 1208 can correct problems in the source image 108 or in the intermediate text detection results, such as the binary text mask 602 of FIG. 6.

After the binary text mask 602 has been refined by k-means clustering, some of the text characters may still be connected to one another. Performing the aspect ratio analysis can remove the artifacts connecting the text characters to allow separation of the individual text characters represented by the text regions 212.

For each of the text characters, the aspect ratio 804 of FIG. 8 can be retrieved from the aspect ratio database 802 of FIG. 8, which can store the aspect ratio information. The aspect ratio 804 can be calculated by dividing the character height 232 of FIG. 2 by the character width 234 of FIG. 2.

Any of the connected components 506 with the aspect ratio 804 less than the aspect ratio average 906 of FIG. 9 is likely to contain two or more of the text characters. However, there are exceptions for some characters, for example m, w, M, and W.

The projection of the text character into horizontal axis can have a projection local minimum 1225 at a connection point 1224 between two of the text characters. The connection point 1224 is near the center of the component. The projection local minimum 1225 can represent the location of the connection point 1224.

The local minima have to be separated by at least ⅓ of the character height 232 to have a probable value for the aspect ratio 804. If more than one minima fit the criteria, then a local minima with the lowest projection value and closest to the center can be selected as the location for dividing the connected components 506 into two separate ones of the text regions 212.

The distance between a text character image 1216 of one of the text regions 212 and the text character class is the minimum distance between the image of the connected components 506 and all of the images in the database that belong to class "C" i.e. $I_k^C$, such that:

$$D(C, I_t) = \min_{k \in DB}\{D(I_k^C, I_t)\} \quad (3)$$

After finding the character label with the highest score, $C_{top\_score}$, the matched distance is calculated as follows:

$$D_{Match} = D(C_{top\_score}, I_t) \quad (4)$$

If one of the connected components 506 meets the aspect ratio criteria of two of the connected components 506, then to divide one of the connected components 506, the $D_{match}$ is calculated and the connected components 506 is split at the local minima, and the distance $D_{match}$ is calculated for the left and right components.

If $$D_{Match} > \frac{D_{Match}^{left} + D_{Match}^{right}}{2},$$

then the left and right components are used as new text characters and new ones of the text regions 212. Otherwise, the component is used without division.

It has been discovered that separating the connected components 506 provides enhanced accuracy for text detection. Reducing all of the text regions 212 to single text characters simplifies processing and increases performance for finding the text characters 112 of FIG. 1 from the source image 108.

Figure 13:
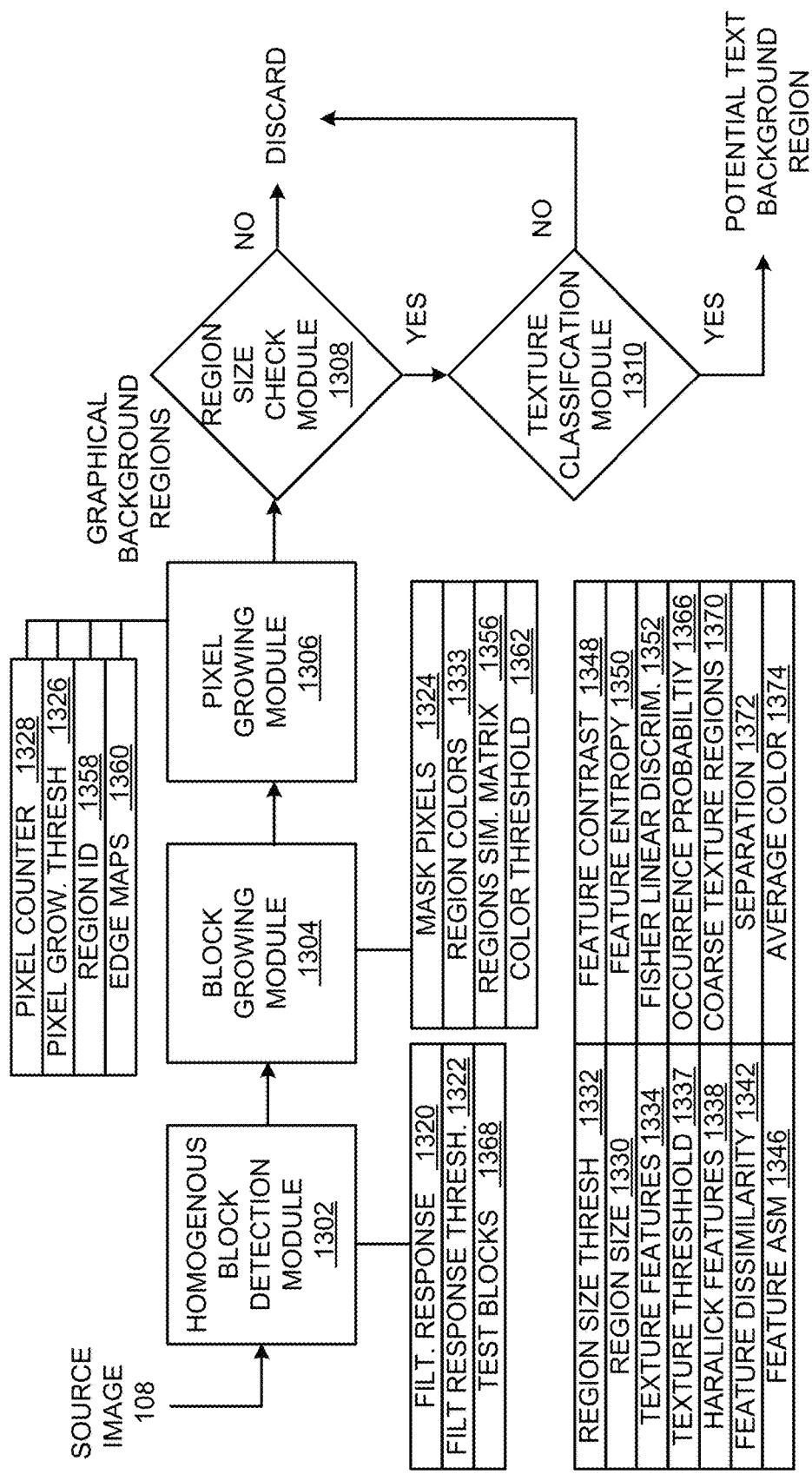
FIG. 13 is a process flow of the background detection module.

Referring now to FIG. 13, herein is shown a process flow of the background detection module 1202. The background detection module 1202 can identify and remove regions of the source image 108 of FIG. 1 that do not contain text. The background detection module 1202 can identify potential text background regions.

The background detection module 1202 can include a homogeneous block detection module 1302, a block growing module 1304, a pixel growing module 1306, a region size check module 1308, and a texture classification module 1310. The background detection module 1202 can detect regions of the source image 108 that have characteristics that indicate that they do not contain text elements. For example, the graphical background regions 214 of FIG. 2 may include regions with no variation, regions that are too complex, or a combination thereof.

The homogeneous block detection module 1302 can identify areas of the source image 108 that are homogeneous. The homogeneous areas are designed as the homogeneous blocks 226 of FIG. 2.

The homogeneous block detection module 1302 can divide the source image 108 into uniformly sized blocks and calculate the filter response 1320 for each of the blocks. If the filter response 1320 for the block is below a filter response threshold 1322, then the block can be designated one of the homogeneous blocks 226.

The source image 108 can be divided into non-overlapping blocks of size k×k pixels, where k is an integer value that can vary based on performance and complexity requirements. For example, k can be 2 to divide the source image 108 into test blocks 1368 of size 2×2. It is understood that k can have different values.

The homogeneous block detection module 1302 can calculate the filter response of the test blocks 1368 by first applying the set of the block filters 302 of FIG. 3 to each of the test blocks 1368 and summing the results for all of the block filters 302. The filter response 1320 can be calculated as follows:

$$\delta^{(m)} = \frac{2}{k^2} \sum_{i=1}^{k^2} I_i w_i^{(m)} \quad (5)$$

where $w_i^{(m)}$ is one of the block filters and I is an intensity value.

Three different types of the block filters 302 can be applied including the diagonal filter 304 of FIG. 3, the horizontal filter 306 of FIG. 3, and the vertical filter 308 of FIG. 3. The homogeneous block detection module 1302 can determine the filter response 1320 for each of the masks to calculate a diagonal filter response value, a horizontal filter response value, and a vertical filter response value.

For each of the test blocks 1368, if the maximum of the filter responses for each of the filters is below the filter response threshold 1322, then the block is homogeneous and can be designated as one of the homogeneous blocks 226. This can be calculated as follows:

$$\max\{|\delta^1|,|\delta^2|,|\delta^3|\} < T_u \quad (6)$$

where $T_u$ is the filter response threshold 1322.

The homogeneous block detection module 1302 can calculate the filter response 1320 and detect the homogeneous blocks 226 for all the blocks in the source image 108. Each of the homogeneous blocks 226 can be labeled with a homogeneous block label. The homogeneous blocks 226 can be represented in a data structure corresponding to the source image 108. After completion, the control flow can pass to the block growing module 1304.

The block growing module 1304 can define homogeneous regions 220 of FIG. 2 by connecting and grouping together the homogeneous blocks 226 that are neighbors and have similar colors. The homogeneous blocks 226 are similar in color if an average color 1374 for one of the homogeneous blocks 226 is within a color threshold 1362 of another directly adjacent one of the homogeneous blocks 226. The color threshold 1362 is a value representing a difference is color. The color threshold 1362 can be a value, percentage, ratio, or a combination thereof.

The block growing module 1304 can calculate color based on different color systems. For example, the block growing module 1304 can use the Lab color space. The Lab color space can be designated the CIE 1976 (L, a, b) color space. The Lab color space is a color-opponent space with dimension L for lightness and a and b for the color opponent dimensions, based on nonlinear compressed CIE XYZ color space coordinates.

The block growing module 1304 can detect the homogeneous blocks 226 that are isolated from other ones of the homogeneous blocks 226. One of the homogeneous blocks 226 is isolated if it has no immediate neighbors that are another one of the homogeneous blocks 226. Any of the homogeneous blocks 226 that are isolated can be discarded.

Discard means that a group of mask pixels 1324 are set to zero where the mask pixels 1324 corresponding to some of the source pixels 202 of FIG. 2 in the source image 108. Thus, when one of the homogeneous blocks 226 or homogeneous regions 220 is discarded, the corresponding ones of the mask pixels 1324 in the binary text mask 602 of FIG. 6 are set to zero indicating they are not one of the text pixels. Discarded pixels do not represent text characters.

A region color 1333 for each the homogeneous regions 220 is determined at the end of the grouping process and a region similarity matrix 1356 is generated where entry [i,j] in the matrix is 1, if region I and region j have similar colors. The region similarity matrix 1356 is a square matrix with each dimension the number of blocks in the source image 108. The region color 1333 is the average color 1374 of one of the homogeneous regions 220.

The block growing module 1304 can connect the homogeneous blocks 226 to identify all of the homogeneous regions 220. Each of the source pixels 202 can be associated with a label to indent the type of pixel. For example, the source pixels 202 can be labeled with a homogeneous region identifier to indicate they are part of one of the homogeneous regions or be unlabeled. Unlabeled can indicate that the pixels are not homogeneous and can be parts of text components. After completion, the control flow can pass to the pixel growing module 1306.

The pixel growing module 1306 can process the list of the source pixels 202 that are unlabeled and merge them with the homogeneous blocks 226 that are adjacent and have a similar color. This can grow the homogeneous blocks 226 by merging similar nearby pixels on a pixel by pixel basis.

The pixel growing module 1306 can generate an edge map 1360 for the source image 108. The edge map 1360 can indicate the borders or discontinuities between different regions in the source image 108. The edge map 1360 can be generated using a variety of edge detection techniques. For example, the edge map 1360 can be generated using Canny edge detection, thresholding, central differences, Prewitt operator, Roberts cross, or other similar techniques.

Each of the source pixels 202 merged with one of the homogeneous blocks 226 can be labeled with a region identification 1358 to indicate that the pixel belongs to one of the homogeneous regions 220. If an unlabeled pixel is not located on an edge between two regions (E(I,j)=0) as indicated in the edge map 1360 and the color difference between the pixel and one of the homogeneous blocks 226 is less than the color threshold 1362 of the homogeneous blocks 226, then the source pixels 202 are assigned the same label as one of the homogeneous blocks 226.

If two of the homogeneous regions 220 with different labels collide, then the homogeneous regions 220 can be merged if the entry for each of the homogeneous regions 220 indicated as I and J in the region similarity matrix have a value of 1. The homogeneous regions 220 collide if the growth of regions causes one of the source pixels 202 to be allocated and labeled for two different ones of the homogeneous regions 220.

The pixel growing process can continue until a pixel counter 1328 exceeds a pixel growth threshold 1326 or all of the source pixels 202 that are unlabeled have been processed. The pixel growth threshold 1326 is the number of pixels to grow each of the non-text regions 210 of FIG. 2. The pixel growth threshold 1326 can be pre-determined, adaptively set, parameter driven, or a combination thereof. After completion, the pixel growing module 1306 can pass the control flow to the region size check module 1308.

The region size check module 1308 can detect and discard the homogeneous regions 220 that are too small to contain text characters. One of the homogeneous regions 220 can be discarded if the area is less than a region size threshold 1332. The region size check module 1308 can check all of the homogeneous regions 220 in ascending order by size. A region size 1330 is the total number of pixels in one of the homogeneous regions 220.

The region size threshold 1332 can be calculated as follows:

$$Tb = \frac{\text{Image Height} \cdot \text{Image Width} \cdot K}{\alpha} \quad (7)$$

Where K is the block size for detecting homogeneous blocks.

$\alpha$ is an empirically determined value of 1500.

The region size check module 1308 can detect and discard any of the homogeneous regions 220 that are below the region size threshold 1332. After completion, the control flow can pass to the texture classification module 1310.

The texture classification module 1310 can classify one of the homogeneous regions 220 as one of the text background regions 216 of FIG. 2 or one of the graphical background regions 214 based on the texture of the homogeneous regions 220. The texture classification module 1310 can identify the homogeneous blocks 226 incorrectly identified as the text background regions 216.

The text background regions 216 are characterized as having fine texture. The texture classification module 1310 can detect texture features 1334 to classify the homogeneous blocks 226. The texture features 1334 are a set of metrics to quantify the perceived texture of an image. The level of the texture features 1334 can measured by comparing the texture features 1334 to a texture threshold 1337. The texture threshold 1337 can be a value, a structure, a vector, a matrix, a percentage, or a combination thereof.

The texture classification module 1310 can detect the texture features 1334 in a variety of ways. For example, the texture features 1334 can be determined using Haralick features 1338 to classify regions into the text background regions 216 and the graphical background regions 214. For example, a region having photographic representations of objects such as cherries may be incorrectly identified as one of the text background regions 216. By determining the texture features 1334 using Haralick analysis, the texture classification module 1310 can identify the region as one of the graphical background regions 214 that does not contain text. In another example, the texture features 1334 can be calculated using structured approaches, statistical approaches, or a combination thereof.

The Haralick features 1338 can be calculated using a grey-level co-occurrence matrix of the source image with a given direction d. The co-occurrence matrix can be used to calculate numerical texture features using spatial relationship between grey levels that have similar intensities. The Haralick features 1338 can be calculated using an occurrence probability 1366 value $P_{i,j}$ that is the probability of the occurrence of grey-level j at the distance of d from the grey-level i in the source image 108.

The Haralick features 1338 can include a feature dissimilarity 1342, a feature angular second moment 1346 (ASM), a feature contrast 1348, and a feature entropy 1350. The Haralick features 1338 can be calculated based on the following equations.

The feature dissimilarity 1342 can be calculated as follows:

$$\sum_{i,j=0}^{N-1} P_{i,j}|i-j| \tag{8}$$

The feature contrast 1348 can be calculated as follows:

$$\sum_{i,j=0}^{N-1} P_{i,j}(i-j)^2 \tag{9}$$

The feature angular second moment can be calculated as follows:

$$\sum_{i,j=0}^{N-1} P_{i,j}^2 \tag{10}$$

The feature entropy 1350 can be calculated as follows:

$$\sum_{i,j=0}^{N-1} P_{i,j}(-\ln P_{i,j}) \tag{11}$$

The values of the Haralick features 1338 vary by the level of texture in the image. The set of values for the Haralick features 1338 can differentiate between one of the text background regions 216 and one of the graphical background regions 214 that do not have text.

In an example for the text background regions 216, one of the text background regions 216 can have the following values: the feature contrast 1348=0.21, the feature dissimilarity=0.19, the feature ASM 1346=0.3, and the feature entropy 1350 of 1.63. In a further example, another of the text background regions 216 can have the following values: the feature contrast 1348=0.5, the feature dissimilarity=0.35, the feature ASM 1346=0.28, and the feature entropy 1350 of 2.04.

In an example for the example for the graphical background regions 214, one of the graphical background regions 214 can have values: the feature contrast 1348=1.06, the feature dissimilarity=0.64, the feature ASM 1346=0.04, and the feature entropy 1350 of 3.7. In a further example, another of the graphical background regions 214 can have the following values: the feature contrast 1348=0.62, the feature dissimilarity=0.48, the feature ASM 1346=0.06, and the feature entropy 1350 of 3.19.

It has been discovered that calculating the Haralick features 1338 can simplify the classification of the homogeneous regions 220. The homogeneous regions 220 that are graphical background regions 214 can have low values for the feature ASM 1346 and high values for the feature entropy 1350. The homogeneous regions 220 that are the text background regions 216 can have the feature ASM 1346 with low values and low values for the feature entropy 1350.

The texture classification module 1310 can detect and discard coarse texture regions 1370. To discriminate coarse and fine textures, the texture classification module 1310 can first smooth out the source image 108 using a 3×3 pixel Gaussian filter with o=0.5 then the source image 108 can be downsized by a factor of 3. Finally three different d vectors can be used for the co-occurrence matrix calculates for [0,2], [2,0], [2,2]. The texture feature vector is 3·4=12 dimensional.

The texture classification module 1310 can be trained offline using known ones of the text regions 212 of FIG. 2 and the graphical background regions 214 that do not have any text. For example, F1 can include feature vectors of text background regions and F0 can include feature vectors of text background regions.

A Fisher linear discriminant 1352 can be used to classify one of the homogeneous regions 220 as being one of the text regions 212 or one of the graphical background regions 214. To calculate the Fisher linear discriminant 1352, the data representing one of the homogeneous regions 220 can be projected into a space using w and y values that the projection of the points from the two classes have a maximum value for a separation 1372. The separation 1372 can be calculated by maximizing the separation 1372 as follows:

$$S = \frac{\sigma_{between}^2}{\sigma_{within}^2} = \frac{(\overline{w}\cdot\overline{\mu}_{y=1} - \overline{w}\cdot\overline{\mu}_{y=0})^2}{\overline{w}^T \Sigma_{y=1}\overline{w} + \overline{w}^T \Sigma_{y=0}\overline{w}} = \frac{(\overline{w}\cdot(\overline{\mu}_{y=1} - \overline{\mu}_{y=0}))^2}{\overline{w}^T(\Sigma_{y=0}+\Sigma_{y=1})\overline{w}} \tag{12}$$

Where μ is the mean and E is the covariance of feature vectors in each class.

The solution is:

$$\vec{w} = (\Sigma_{y=0}+\Sigma_{y=1})^{-1}(\vec{\mu}_{y=1}-\vec{\mu}_{y=0}) \tag{13}$$

Where μ is the mean and Σ is the covariance of feature vectors in each class.

The texture classification module 1310 can identify the potential text background regions based on homogeneity, color, size, and texture. After completion, the control flow can pass to the text extraction module 1204 of FIG. 12.

It has been discovered that expanding the homogenous regions by merging with similarly colored pixels that are directly adjacent to the homogenous regions can increase accuracy by identifying likely areas for related text. Pixel growth and merge can further identify the homogeneous regions that are partially separated due to graphical irregularities.

It has been discovered that discarding homogeneous regions with coarse texture can reduce the number of incorrect text candidates and reduce false alarms. The homogeneous areas with coarse texture are less likely to be a text background.

It has been discovered that identifying the homogenous regions as potential text background regions can improve performance. The homogenous regions having a fine texture are more likely to contain text.

However, since the projection and threshold values are calculated using offline training, using different image sizes might affect the result of texture-based region classification. Thus, offline training may produce results that are less stable.

Figure 14:
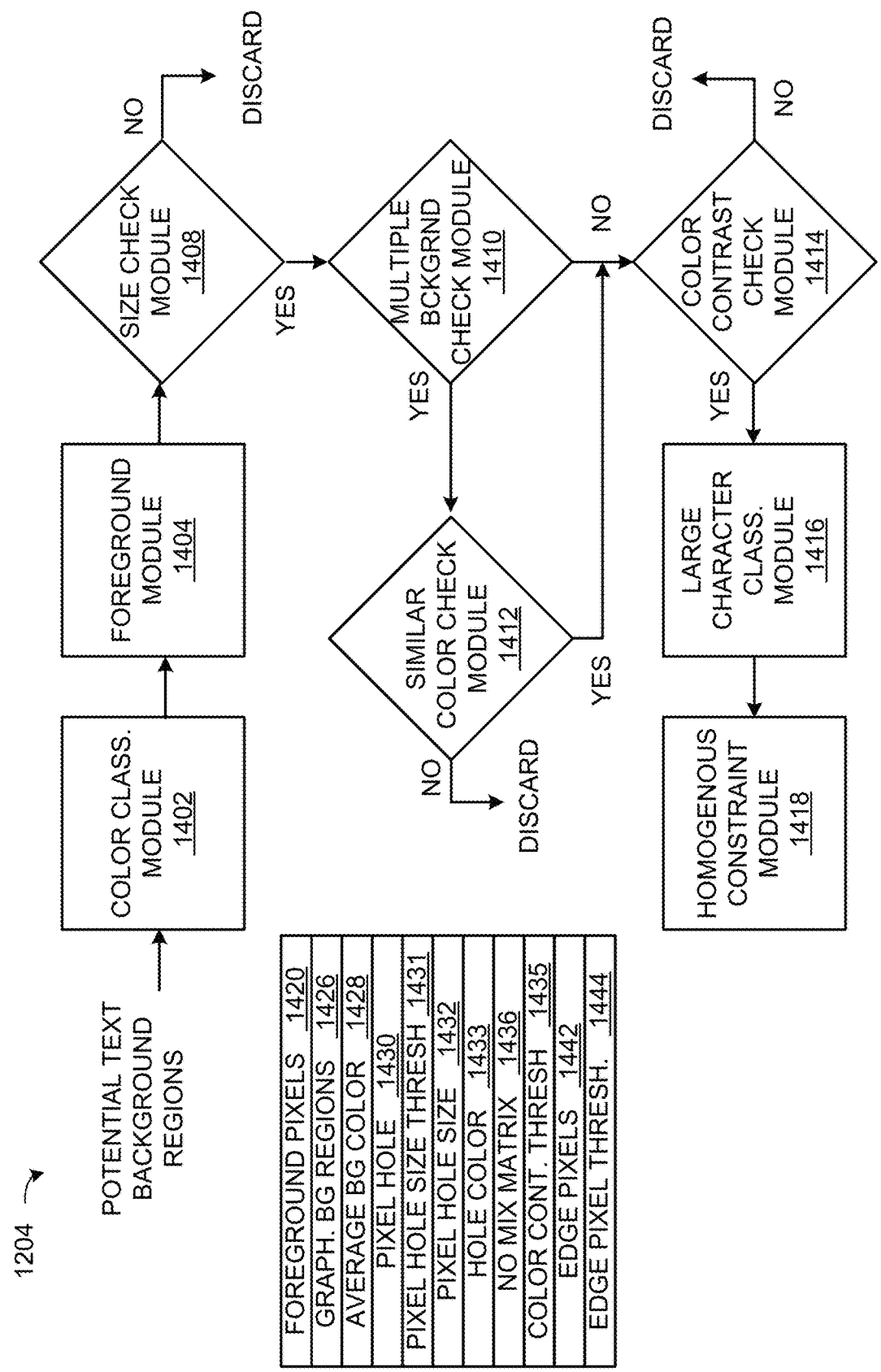
FIG. 14 is a process flow of the text extraction module.

Referring now to FIG. 14 therein is shown a process flow of the text extraction module 1204. The text extraction module 1204 can extract the text regions 212 of FIG. 2 from the source image 108 of FIG. 1. The text extraction module 1204 can detect and differentiate text from the source image 108 using color, contrast, size, shape, type of background, or a combination thereof.

The text extraction module 1204 can include a color classification module 1402, a foreground connected component module 1404, a hole size check module 1408, a multiple background check module 1410 a similar color check module 1412, a color contrast check module 1414, a large character classification module 1416, and a homogeneous constraint module 1418.

The color classification module 1402 can evaluate the text background regions 216 of FIG. 2 to determine if they potentially contain text based on the difference in color between two of the regions. The color classification module 1402 can label each of the source pixels 202 of FIG. 2 in one of the text background regions 216 as being one of the background pixels 231 of FIG. 2. In another example, The color classification module 1402 can process each of the text background regions 216 in size order by starting with the smallest and going in ascending order of size. By processing the text background regions 216 in ascending size order, some of the disqualified regions can be designated as one of the graphical background regions 214 of FIG. 2 and can later be merged into a larger neighboring region. Aggregating the smaller of the potential text regions 212 can allow later merger into another of the graphical background regions 214 or one of the text regions 212.

The color classification module 1402 can include a no mix matrix 1436 to keep track of the source pixels 202 that are labeled. The no mix matrix 1436 can be initialized with a list of the labeled regions.

Each time one of the regions is processed by the color classification module 1402, only the source pixels 202 with the same label as the region or without a label in the no mix matrix 1436 can be modified. If one of the regions is discarded, the entries in the no mix matrix 1436 can be set to zero to allow future modification and possible merge into another region in later processing. When the color classification module 1402 has completed, the control flow can pass to the foreground connected component module 1404.

The foreground connected component module 1404 can identify the source pixels 202 of isolated regions 1222 of FIG. 12 as being foreground pixels 1420 or the background pixels 231. The isolated regions 1222 are regions not in direct contact with another region. The foreground pixels 1420 have a significant difference in contrast to the average color 1374 of FIG. 13 of one of the text background regions 216 where the foreground pixels 1420 reside. The foreground pixels 1420 can represent text. The background pixels 231 do not have a significant difference in contrast to the average color 1374 of the region they are in.

For each labeled one of the graphical background regions 214, the region can be isolated and all of the unlabeled pixels connected to the region can be examined and classified as the foreground pixels 1420 or background pixels 231.

If one of the source pixels 202 at the pixel location 204 of FIG. 2 $i,j$ has a significant contrast with respect to the color of the text background regions 216, then the selected one of the source pixels 202 can be labeled as one of the foreground pixels 1420. For example, a contrast value of more than 3 to 3.5 standard deviations can be considered significant. However, it is understood that the contrast threshold can vary. The foreground pixels 1420 can be identified using the following equation:

$$|L(i,j)-\overline{L}_{BG}|<3\sigma_{L_{BG}} \vee |a(i,j)-\overline{a}_{BG}|>3.5\sigma_{a_{BG}} \vee |b(i,j)-\overline{b}_{BG}|>3.5\sigma_{b_{BG}} \quad (14)$$

Where: L(i,j) is a pixel at location (i,j)

$\overline{L}_{BG}, \overline{a}_{BG}, \overline{b}_{BG}$ are the average Lab color space values of the background region.

$\sigma_{L_{BG}}, \sigma_{a_{BG}}, \alpha\sigma_{b_{BG}}$ are the corresponding standard deviations for each color component.

For the source pixels 202 having the same one of the label as the graphical background regions 214 or no label in the no mix matrix 1436 can be labeled as belonging to the graphical background regions 214 if the pixel color 206 of FIG. 2 is similar to an average background color 1428 of one of the graphical background regions 214. For example, a color difference of more than 3 standard deviations can be considered significant. In another example, a color difference of more than 3.5 standard deviations can be considered significant. However, it is understood that the color difference threshold can vary. The label can be determined in the equation:

$$|L(i,j)-\overline{L}_{BG}|<3\sigma_{L_{BG}} \wedge |a(i,j)-\overline{a}_{BG}|>3.5\sigma_{a_{BG}} \wedge |b(i,j)-\overline{b}_{BG}|>3.5\sigma_{b_{BG}} \quad (15)$$

Where: L(i,j) is a pixel at location (i,j)

$\overline{L}_{BG}, \overline{a}_{BG}, \overline{b}_{BG}$ are the average Lab color space values of the background region.

$\sigma_{L_{BG}}, \sigma_{a_{BG}}, \sigma_{b_{BG}}$ are the corresponding standard deviations for each color component.

The color classification module 1402 can classify each of the source pixels 202 in a region as being one of the background pixels 231 or the non-background pixels 231. When completed, the control flow can pass to the hole size check module 1408.

The hole size check module 1408 can identify potential text characters in pixel holes 1430 in the text background regions 216. The text background regions 216 that are candidates for having text characters can be isolated and analyzed for holes and other features that indicate that text may be present in the region. The pixel holes 1430 are sets of the source pixels 202 surrounded by the text background regions 216 that are significantly different from the rest of the text background regions 216.

The pixel holes 1430 can be labeled as the text pixels 230 of FIG. 2 of one of the text regions 212 if a pixel hole size 1432 is greater than a pixel hole size threshold 1431. The pixel hole size 1432 is the total number of pixels assigned to the pixel hole 1430.

The pixel hole size threshold 1431 can be a pixel count, calculated based on the source image, pre-determined, calculated dynamically, or a combination thereof. If the pixel holes 1430 are less than or equal to the pixel hole size threshold 1431, then the source pixels 202 of the pixel holes 1430 are discarded. If the pixel hole size 1432 is greater than the pixel hole size threshold 1431, then the control flow can pass to the multiple background check module 1410.

The pixel holes 1430 can include a hole color 1433. The hole color 1433 is a color representative of the pixel hole 1430. The pixel color 206 can be an averaged color, a most frequent color, or a combination thereof. The pixel holes 1430 can include a color contrast threshold 1435. The hole color 1433 is contrasting to the color of another element if the difference between the two colors is greater than or equal to the color contrast threshold 1435.

The multiple background check module 1410 can determine if the pixel hole 1430 is positioned between two of the text background regions 216. If one of the pixel holes 1430 is between two of the text background regions 216, then control flow can pass to the similar color check module 1412. If not, then the control flow can pass to the color contrast check module 1414.

The similar color check module 1412 can determine if the pixel hole 1430 and the surrounding ones of the source pixels 202 have similar color. If the color is not similar, then the pixel holes 1430 can be discarded. If the colors are similar, then the control flow can pass to the color contrast check module 1414.

The color contrast check module 1414 can determine if the pixel holes 1430 and the source pixels 202 surrounding the pixel holes 1430 have contrasting color from the pixel holes 1430. If the colors are not contrasting, then the pixel holes 1430 can be discarded. If the colors are contrasting, then the control flow can pass to the large character classification module 1416.

The large character classification module 1416 can determine if the pixel holes 1430 represents a text character with a large font having a hole in it or if it represent a region with a hole in it. For example, this can be the case where a large character, such as a 64 point font "A", can be misclassified as one of the text background regions 216 rather than classified as one of the text regions 212. The large character classification module 1416 can compare the text background regions to known text characters to if the large character should be reclassified. In another example, holes can be detected using edge detection, pattern matching, color matching, transforms, or a combination thereof. It is understood that other image processing techniques can be used to detect large characters with holes. After completion, the control flow can pass to the homogeneous constraint module 1418.

The homogeneous constraint module 1418 can differentiation text from other foreground objects using the edge map 1360 of FIG. 13. Ideally, one of the homogeneous regions 220 of FIG. 2 cannot contain any of the source pixels 202 forming the edge of one of the regions. Since the segmentation of text from the background is not perfect, one of the text regions may include a small number of edge pixels 1442 on the boundary of text characters.

To minimize the effect of the edge pixels 1442, an edge pixel threshold 1444 can be applied to the number of the edge pixels 1442 in one of the pixel holes 1430. The maximum number of the edge pixels 1442 can be limited to 100 or 0.2 times the total number of pixels.

For example, a complex graphical object with many holes may have a large number of the edge pixels 1442 in one of the text background regions 216. Simple figures can include object such as uniform characters, numbers, or simple geometric shapes. In another example, It has been discovered that identifying foreground objects can improve text detection performance. Grouping the foreground pixels together increases the likelihood of the presence of text characters.

It has been discovered that detecting large text based on the size of the pixel holes increases flexibility and improves accuracy. Searching for text characters with similar color and pixel holes can provide improved text detection for images having large text size variance such as advertisements.

Figure 15:
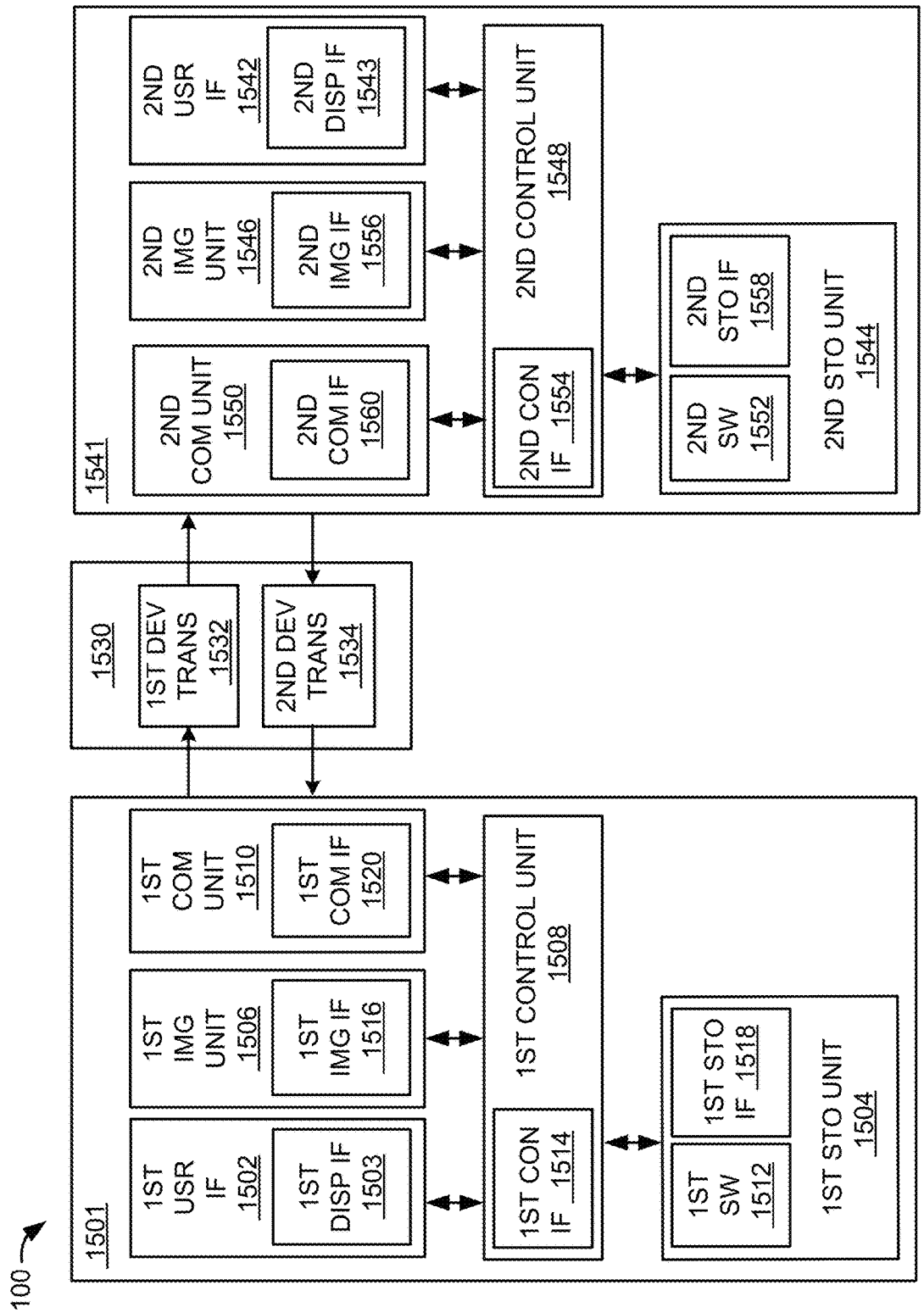
FIG. 15 is a functional block diagram of the image processing system for cluttered scenes.

Referring now to FIG. 15, therein is shown an example of a functional block diagram of the image processing system 100 for cluttered scenes. The image processing system 100 can include a first device 1501, a second device 1541 and a communication link 1530.

The image processing system 100 can be implemented using the first device 1501, the second device 1541, and the communication link 1530. For example, the first device 1501 can implement the image processing device 102 of FIG. 1, the second device 1541 can implement the display device 104 of FIG. 1. And the communication link 1530 can implement the communication path 106 of FIG. 1. However, it is understood that the image processing system 100 can be implemented in a variety of ways and the functionality of the image processing device 102, the display device 104, and the communication path 106 can be partitioned differently over the first device 1501, the second device 1541, and the communication link 1530.

The first device 1501 can communicate with the second device 1541 over the communication link 1530. The first device 1501 can send information in a first device transmission 1532 over the communication link 1530 to the second device 1541. The second device 1541 can send information in a second device transmission 1534 over the communication link 1530 to the first device 1501.

For illustrative purposes, the image processing system 100 is shown with the first device 1501 as a client device, although it is understood that the image processing system 100 can have the first device 1501 as a different type of device. For example, the first device can be a server.

Also for illustrative purposes, the image processing system 100 is shown with the second device 1541 as a server, although it is understood that the image processing system 100 can have the second device 1541 as a different type of device. For example, the second device 1541 can be a client device.

For brevity of description in this embodiment of the present invention, the first device 1501 will be described as a client device, such as a video camera, smart phone, or a combination thereof. The present invention is not limited to this selection for the type of devices. The selection is an example of the present invention.

The first device 1501 can include a first control unit 1508. The first control unit 1508 can include a first control interface 1514. The first control unit 1508 can execute a first software 1512 to provide the intelligence of the image processing system 100.

The first control unit 1508 can be implemented in a number of different manners. For example, the first control unit 1508 can be a processor, an embedded processor, a microprocessor, a hardware control logic, a hardware finite state machine (FSM), a digital signal processor (DSP), or a combination thereof.

The first control interface 1514 can be used for communication between the first control unit 1508 and other functional units in the first device 1501. The first control interface 1514 can also be used for communication that is external to the first device 1501.

The first control interface 1514 can receive information from the other functional units or from external sources, or can transmit information to the other functional units or to external destinations. The external sources and the external destinations refer to sources and destinations external to the first device 1501.

The first control interface 1514 can be implemented in different ways and can include different implementations depending on which functional units or external units are being interfaced with the first control interface 1514. For example, the first control interface 1514 can be implemented with electrical circuitry, microelectromechanical systems (MEMS), optical circuitry, wireless circuitry, wireline circuitry, or a combination thereof.

The first device 1501 can include a first storage unit 1504. The first storage unit 1504 can store the first software 1512. The first storage unit 1504 can also store the relevant information, such as images, syntax information, video, profiles, display preferences, sensor data, or any combination thereof.

The first storage unit 1504 can be a volatile memory, a nonvolatile memory, an internal memory, an external memory, or a combination thereof. For example, the first storage unit 1504 can be a nonvolatile storage such as non-volatile random access memory (NVRAM), Flash memory, disk storage, or a volatile storage such as static random access memory (SRAM).

The first storage unit 1504 can include a first storage interface 1518. The first storage interface 1518 can be used for communication between the first storage unit 1504 and other functional units in the first device 1501. The first storage interface 1518 can also be used for communication that is external to the first device 1501.

The first device 1501 can include a first imaging unit 1506. The first imaging unit 1506 can capture the source image 108 of FIG. 1 from the real world. The first imaging unit 1506 can include a digital camera, a video camera, an optical sensor, or any combination thereof.

The first imaging unit 1506 can include a first imaging interface 1516. The first imaging interface 1516 can be used for communication between the first imaging unit 1506 and other functional units in the first device 1501.

The first imaging interface 1516 can receive information from the other functional units or from external sources, or can transmit information to the other functional units or to external destinations. The external sources and the external destinations refer to sources and destinations external to the first device 1501.

The first imaging interface 1516 can include different implementations depending on which functional units or external units are being interfaced with the first imaging unit 1506. The first imaging interface 1516 can be implemented with technologies and techniques similar to the implementation of the first control interface 1514.

The first storage interface 1518 can receive information from the other functional units or from external sources, or can transmit information to the other functional units or to external destinations. The external sources and the external destinations refer to sources and destinations external to the first device 1501.

The first storage interface 1518 can include different implementations depending on which functional units or external units are being interfaced with the first storage unit 1504. The first storage interface 1518 can be implemented with technologies and techniques similar to the implementation of the first control interface 1514.

The first device 1501 can include a first communication unit 1510. The first communication unit 1510 can be for enabling external communication to and from the first device 1501. For example, the first communication unit 1510 can permit the first device 1501 to communicate with the second device 1541, an attachment, such as a peripheral device or a computer desktop, and the communication link 1530.

The first communication unit 1510 can also function as a communication hub allowing the first device 1501 to function as part of the communication link 1530 and not limited to be an end point or terminal unit to the communication link 1530. The first communication unit 1510 can include active and passive components, such as microelectronics or an antenna, for interaction with the communication link 1530.

The first communication unit 1510 can include a first communication interface 1520. The first communication interface 1520 can be used for communication between the first communication unit 1510 and other functional units in the first device 1501. The first communication interface 1520 can receive information from the other functional units or can transmit information to the other functional units.

The first communication interface 1520 can include different implementations depending on which functional units are being interfaced with the first communication unit 1510. The first communication interface 1520 can be implemented with technologies and techniques similar to the implementation of the first control interface 1514.

The first device 1501 can include a first user interface 1502. The first user interface 1502 allows a user (not shown) to interface and interact with the first device 1501. The first user interface 1502 can include a first user input (not shown). The first user input can include touch screen, gestures, motion detection, buttons, slicers, knobs, virtual buttons, voice recognition controls, or any combination thereof.

The first user interface 1502 can include the first display interface 1503. The first display interface 1503 can allow the user to interact with the first user interface 1502. The first display interface 1503 can include a display, a video screen, a speaker, or any combination thereof.

The first control unit 1508 can operate with the first user interface 1502 to display image information generated by the image processing system 100 on the first display interface 1503. The first control unit 1508 can also execute the first software 1512 for the other functions of the image processing system 100, including receiving image information from the first storage unit 1504 for display on the first display interface 1503. The first control unit 1508 can further execute the first software 1512 for interaction with the communication link 1530 via the first communication unit 1510.

For illustrative purposes, the first device 1501 can be partitioned having the first user interface 1502, the first storage unit 1504, the first control unit 1508, and the first communication unit 1510, although it is understood that the first device 1501 can have a different partition. For example, the first software 1512 can be partitioned differently such that some or all of its function can be in the first control unit 1508 and the first communication unit 1510. Also, the first device 1501 can include other functional units not shown in FIG. 17 for clarity.

The image processing system 100 can include the second device 1541. The second device 1541 can be optimized for implementing the present invention in a multiple device embodiment with the first device 1501. The second device 1541 can provide the additional or higher performance processing power compared to the first device 1501.

The second device 1541 can include a second control unit 1548. The second control unit 1548 can include a second control interface 1554. The second control unit 1548 can execute a second software 1552 to provide the intelligence of the image processing system 100.

The second control unit 1548 can be implemented in a number of different manners. For example, the second control unit 1548 can be a processor, an embedded processor, a microprocessor, a hardware control logic, a hardware finite state machine (FSM), a digital signal processor (DSP), or a combination thereof.

The second control interface 1554 can be used for communication between the second control unit 1548 and other functional units in the second device 1541. The second control interface 1554 can also be used for communication that is external to the second device 1541.

The second control interface 1554 can receive information from the other functional units or from external sources, or can transmit information to the other functional units or to external destinations. The external sources and the external destinations refer to sources and destinations external to the second device 1541.

The second control interface 1554 can be implemented in different ways and can include different implementations depending on which functional units or external units are being interfaced with the second control interface 1554. For example, the second control interface 1554 can be implemented with electrical circuitry, microelectromechanical systems (MEMS), optical circuitry, wireless circuitry, wireline circuitry, or a combination thereof.

The second device 1541 can include a second storage unit 1544. The second storage unit 1544 can store the second software 1552. The second storage unit 1544 can also store the relevant information, such as images, syntax information, video, profiles, display preferences, sensor data, or any combination thereof.

The second storage unit 1544 can be a volatile memory, a nonvolatile memory, an internal memory, an external memory, or a combination thereof. For example, the second storage unit 1544 can be a nonvolatile storage such as non-volatile random access memory (NVRAM), Flash memory, disk storage, or a volatile storage such as static random access memory (SRAM).

The second storage unit 1544 can include a second storage interface 1558. The second storage interface 1558 can be used for communication between the second storage unit 1544 and other functional units in the second device 1541. The second storage interface 1558 can also be used for communication that is external to the second device 1541.

The second storage interface 1558 can receive information from the other functional units or from external sources, or can transmit information to the other functional units or to external destinations. The external sources and the external destinations refer to sources and destinations external to the second device 1541.

The second storage interface 1558 can include different implementations depending on which functional units or external units are being interfaced with the second storage unit 1544. The second storage interface 1558 can be implemented with technologies and techniques similar to the implementation of the second control interface 1554.

The second device 1541 can include a second imaging unit 1546. The second imaging unit 1546 can capture the source image 108 from the real world. The first imaging unit 1506 can include a digital camera, a video camera, an optical sensor, or any combination thereof.

The second imaging unit 1546 can include a second imaging interface 1556. The second imaging interface 1556 can be used for communication between the second imaging unit 1546 and other functional units in the second device 1541.

The second imaging interface 1556 can receive information from the other functional units or from external sources, or can transmit information to the other functional units or to external destinations. The external sources and the external destinations refer to sources and destinations external to the second device 1541.

The second imaging interface 1556 can include different implementations depending on which functional units or external units are being interfaced with the second imaging unit 1546. The second imaging interface 1556 can be implemented with technologies and techniques similar to the implementation of the first control interface 1514.

The second device 1541 can include a second communication unit 1550. The second communication unit 1550 can enable external communication to and from the second device 1541. For example, the second communication unit 1550 can permit the second device 1541 to communicate with the first device 1501, an attachment, such as a peripheral device or a computer desktop, and the communication link 1530.

The second communication unit 1550 can also function as a communication hub allowing the second device 1541 to function as part of the communication link 1530 and not limited to be an end point or terminal unit to the communication link 1530. The second communication unit 1550 can include active and passive components, such as microelectronics or an antenna, for interaction with the communication link 1530.

The second communication unit 1550 can include a second communication interface 1560. The second communication interface 1560 can be used for communication between the second communication unit 1550 and other functional units in the second device 1541. The second communication interface 1560 can receive information from the other functional units or can transmit information to the other functional units.

The second communication interface 1560 can include different implementations depending on which functional units are being interfaced with the second communication unit 1550. The second communication interface 1560 can be implemented with technologies and techniques similar to the implementation of the second control interface 1554.

The second device 1541 can include a second user interface 1542. The second user interface 1542 allows a user (not shown) to interface and interact with the second device 1541. The second user interface 1542 can include a second user input (not shown). The second user input can include touch screen, gestures, motion detection, buttons, slicers, knobs, virtual buttons, voice recognition controls, or any combination thereof.

The second user interface 1542 can include a second display interface 1543. The second display interface 1543 can allow the user to interact with the second user interface 1542. The second display interface 1543 can include a display, a video screen, a speaker, or any combination thereof.

The second control unit 1548 can operate with the second user interface 1542 to display information generated by the image processing system 100 on the second display interface 1543. The second control unit 1548 can also execute the second software 1552 for the other functions of the image processing system 100, including receiving display information from the second storage unit 1544 for display on the second display interface 1543. The second control unit 1548 can further execute the second software 1552 for interaction with the communication link 1530 via the second communication unit 1550.

For illustrative purposes, the second device 1541 can be partitioned having the second user interface 1542, the second storage unit 1544, the second control unit 1548, and the second communication unit 1550, although it is understood that the second device 1541 can have a different partition. For example, the second software 1552 can be partitioned differently such that some or all of its function can be in the second control unit 1548 and the second communication unit 1550. Also, the second device 1541 can include other functional units not shown in FIG. 17 for clarity.

The first communication unit 1510 can couple with the communication link 1530 to send information to the second device 1541 in the first device transmission 1532. The second device 1541 can receive information in the second communication unit 1550 from the first device transmission 1532 of the communication link 1530.

The second communication unit 1550 can couple with the communication link 1530 to send image information to the first device 1501 in the second device transmission 1534. The first device 1501 can receive image information in the first communication unit 1510 from the second device transmission 1534 of the communication link 1530. The image processing system 100 can be executed by the first control unit 1508, the second control unit 1548, or a combination thereof.

The functional units in the first device 1501 can work individually and independently of the other functional units. For illustrative purposes, the image processing system 100 is described by operation of the first device 1501. It is understood that the first device 1501 can operate any of the modules and functions of the image processing system 100. For example, the first device 1501 can be described to operate the first control unit 1508.

The functional units in the second device 1541 can work individually and independently of the other functional units. For illustrative purposes, the image processing system 100 can be described by operation of the second device 1541. It is understood that the second device 1541 can operate any of the modules and functions of the image processing system 100. For example, the second device 1541 is described to operate the second control unit 1548.

For illustrative purposes, the image processing system 100 is described by operation of the first device 1501 and the second device 1541. It is understood that the first device 1501 and the second device 1541 can operate any of the modules and functions of the image processing system 100. For example, the first device 1501 is described to operate the first control unit 1508, although it is understood that the second device 1541 can also operate the first control unit 1508.

The physical transformation from the images of physical objects of the source image 108 to displaying the output text on the pixel elements of the display device 104 of FIG. 1 results in physical changes to the pixel elements of the display device 104 in the physical world, such as the change of electrical state the pixel element, is based on the operation of the image processing system 100. As the changes in the physical world occurs, such as the motion of the imaging sensor used to capture the source image 108, the movement itself creates additional information, such as the updates to the source image 108, that are converted back into changes in the pixel elements of the display device 104 for continued operation of the image processing system 100.

The first software 1512 of FIG. 15 of the first device 1501 can implement portions of the image processing system 100. For example, the first software 1512 can include the background detection module 1202, the text extraction module 1204, the enhancement module 1206, and the aspect ratio module 1208.

The first control unit 1508 of FIG. 15 can execute the first software 1512 for the background detection module 1202 to extract the text background regions 216 from the source image 108. The first control unit 1508 can execute the first software 1512 for the text extraction module 1204 to identify the text regions 212. The first control unit 1508 can execute the first software 1512 for the enhancement module 1206 to enhance the detection results. The first control unit 1508 can execute the first software 1512 for the aspect ratio module 1208 to detect the connected components 506.

The second software 1552 of FIG. 15 of the second device 1541 of FIG. 15 can implement portions of the image processing system 100. For example, the second software 1552 can include the background detection module 1202, the text extraction module 1204, the enhancement module 1206, and the aspect ratio module 1208.

The second control unit 1548 of FIG. 15 can execute the second software 1552 for the background detection module 1202 to extract the text background regions 216 from the source image 108. The second control unit 1548 can execute the second software 1552 for the text extraction module 1204 to identify the text regions 212. The second control unit 1548 can execute the second software 1552 for the enhancement module 1206 to enhance the detection results. The second control unit 1548 can execute the second software 1552 for the aspect ratio module 1208 to detect the connected components 506.

The image processing system 100 can be partitioned between the first software 1512 and the second software 1552. For example, the first software 1512 can include the background detection module 1202 and the text extraction module 1204 and the second software 1552 can include the enhancement module 1206 and the aspect ratio module 1208. The first control unit 1508 can execute the modules partitioned to the first software 1512. The second control unit 1548 can execute modules partitioned to the second software 1552.

The first control unit 1508 can operate the first communication unit 1510 of FIG. 15 to send the source image 108 to the second device 1541. The first control unit 1508 can operate the first software 1512 to operate the first imaging unit 1506 of FIG. 15. The second communication unit 1550 of FIG. 15 can send the source image 108 to the first device 1501 over the communication link 1530.

The image processing system 100 describes the module functions or order as an example. The modules can be partitioned differently. For example, the background detection module 1202 and the text extraction module 1204 can be combined. Each of the modules can operate individually and independently of the other modules.

Furthermore, data generated in one module can be used by another module without being directly coupled to each other. For example, the text extraction module 1204 can receive the source image 108 from the background detection module 1202.

The modules can be implemented in a variety of ways. The background detection module 1202 and the text extraction module 1204 can be implemented in hardware accelerators (not shown) within the first control unit 1508 or the second control unit 1548, or can be implemented in hardware accelerators (not shown) in the first device 1501 or the second device 1541 outside of the first control unit 1508 or the second control unit 1548.

Figure 16:
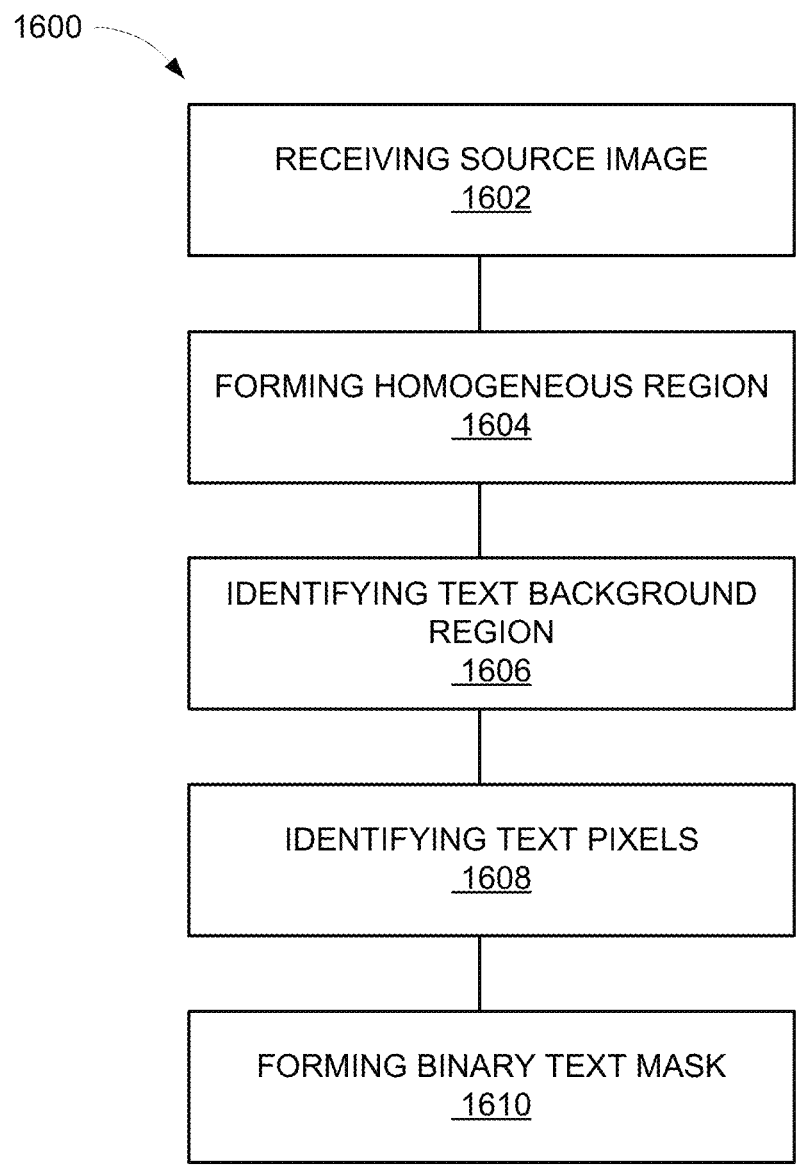
FIG. 16 is an example of a flow chart of a method of operation of the image processing system in a further embodiment of the present invention.

Referring now to FIG. 16, therein is shown a flow chart of a method 1600 of operation of the image processing system in a further embodiment of the present invention. The method 1600 includes: receiving a source image having source pixels in a block 1602; forming a homogeneous region in the source image by merging homogeneous blocks each having a block color within a color threshold in a block 1604; identifying a text background region in the homogeneous region, the text background region having a texture feature above a texture threshold and a region size above a region size threshold in a block 1606; identifying text pixels and background pixels by k-means clustering the source pixels in the text background region in a block 1608; and forming a binary text mask representing the text pixels and the background pixels for displaying on a device in a block 1610.

It has been discovered that the present invention thus has numerous aspects. The present invention valuably supports and services the historical trend of reducing costs, simplifying systems, and increasing performance. These and other valuable aspects of the present invention consequently further the state of the technology to at least the next level.

Thus, it has been discovered that the image processing system of the present invention furnishes important and heretofore unknown and unavailable solutions, capabilities, and functional aspects for efficiently coding and decoding image content. The resulting processes and configurations are straightforward, cost-effective, uncomplicated, highly versatile and effective, can be surprisingly and unobviously implemented by adapting known technologies, and are thus readily suited for efficiently and economically manufacturing image processing devices fully compatible with conventional manufacturing processes and technologies. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:
   receiving a source image having source pixels;
   forming a homogeneous region in the source image by merging homogeneous blocks each having a block color within a color threshold;
   identifying a text background region in the homogeneous region, the text background region having a texture feature above a texture threshold and a region size above a region size threshold;
   identifying text pixels and background pixels by k-means clustering the source pixels in the text background region, wherein k-means clustering includes partitioning n points into k clusters where each of the points belongs to a cluster with a nearest mean, the mean of each cluster serves as a base point for the cluster, and the n points represent all source pixels related to a bounding box, wherein identifying the text pixels further includes dividing the text pixels based on a projection local minimum, wherein the projection local minimum comprises a location of a connection point;
   forming a binary text mask representing the text pixels and the background pixels for displaying on a device; and
   identifying the text pixels of a pixel hole in the text background region, the pixel hole having a pixel hole size above a pixel hole size threshold, and a hole color greater than or equal to a color contrast threshold of the text background region, and minimizing an effect of edge pixels by applying an edge pixel threshold to a number of the edge pixels in the pixel hole, wherein the edge pixel threshold is a percentage of a total number of pixels.

2. The method as claimed in claim 1 wherein forming the homogeneous region includes:
   identifying the homogeneous blocks having a filter response lower than a filter response threshold; and
   growing the homogeneous region by merging the source pixels directly adjacent and having a pixel color within a color threshold of a region color, wherein growing the homogeneous region includes generating an edge map which indicates borders and discontinuities between different regions of the source image.

3. The method as claimed in claim 1 wherein forming the text background region includes determining the texture feature of a Haralick texture feature of dissimilarity, angular second moment, contrast, or entropy.

4. The method as claimed in claim 1 further comprising identifying the background pixels of the text background region having a Fisher linear discriminant indicating a coarse texture.

5. A method of operation of an image processing system comprising:
   receiving a source image having source pixels;
   forming a homogeneous region in the source image by merging homogeneous blocks each having a block color within a color threshold;
   identifying a text background region in the homogeneous region, the text background region having a texture feature above a texture threshold and a region size above a region size threshold;
   identifying a text component within the text background region, wherein identifying the text component includes dividing the text component based on a projection local minimum, wherein the projection local minimum comprises a location of a connection point;

identifying text pixels and background pixels by k-means clustering the source pixels within a bounding box surrounding the text component;

forming a binary text mask representing the text pixels and the background pixels for displaying on a device; and identifying the text pixels of a pixel hole in the text background region, the pixel hole having a pixel hole size above a pixel hole size threshold, and a hole color greater than or equal to a color contrast threshold of the text background region, and minimizing an effect of edge pixels by applying an edge pixel threshold to a number of the edge pixels in the pixel hole, wherein the edge pixel threshold is a percentage of a total number of pixels.

6. The method as claimed in claim 5 further comprising:
detecting a foreground pixel having a pixel color exceeding the color threshold of the text background region; and
identifying the text pixels corresponding to the foreground pixel.

7. The method as claimed in claim 5 further comprising detecting the text component having an aspect ratio less than or equal to an aspect ratio threshold for separating the text component into one text component and another text component.

8. The method as claimed in claim 5 wherein forming the homogeneous region includes identifying the background pixels of the homogeneous blocks isolated from all other homogeneous blocks.

9. An image processing system comprising:
a non-transitory memory for storing:
  a source image having source pixels;
  homogeneous blocks in the source image having a block color;
a processor configured for:
  forming a homogeneous region in the source image by merging the homogeneous blocks each having the block color within a color threshold;
  identifying a text background region having text pixels and background pixels in the homogeneous region with the text background region having a texture feature above a texture threshold and a region size above a region size threshold;
  identifying text pixels and background pixels by k-means clustering source pixels in the text background region, wherein identifying the text pixels further includes dividing the text pixels based on a projection local minimum, wherein the projection local minimum comprises a location of a connection point;
  forming a binary text mask representing the text pixels and the background pixels for displaying on a device; and
  identifying the text pixels of a pixel hole in the text background region, the pixel hole having a pixel hole size above a pixel hole size threshold, and a hole color greater than or equal to a color contrast threshold of the text background region, and minimizing an effect of edge pixels by applying an edge pixel threshold to a number of the edge pixels in the pixel hole, wherein the edge pixel threshold is a percentage of a total number of pixels.

10. The system as claimed in claim 9 wherein forming the homogeneous region includes:
identifying the homogeneous blocks having a filter response lower than a filter response threshold; and
growing the homogeneous region by merging the source pixels directly adjacent and having a pixel color within the color threshold of a region color, wherein growing the homogeneous region includes generating an edge map which indicates borders and discontinuities between different regions of the source image.

11. The system as claimed in claim 9 wherein forming the text background region includes determining the texture feature of a Haralick texture feature of dissimilarity, angular second moment, contrast, or entropy.

12. The system as claimed in claim 9 wherein the binary text mask includes the background pixels of the text background region having a Fisher linear discriminant indicating a coarse texture.

13. The system as claimed in claim 9 further comprising identifying a text component within the text background region; the text component having text pixels and background pixels within a bounding box surrounding the text component.

14. The system as claimed in claim 13 further comprising detecting a foreground pixel having a pixel color exceeding the color threshold of the text background region; and identifying the text pixels corresponding to the foreground pixel.

15. The system as claimed in claim 13 wherein the text component includes an aspect ratio less than or equal to an aspect ratio threshold for separating the text component into one text component and another text component.

16. The system as claimed in claim 13 wherein the homogeneous region includes the background pixels of the homogeneous blocks isolated from all other homogeneous blocks.

17. The system as claimed in claim 13 wherein the text component is divided based on a projection local minimum.

* * * * *